US009284966B2

(12) United States Patent
Seebode et al.

(10) Patent No.: US 9,284,966 B2
(45) Date of Patent: Mar. 15, 2016

(54) HYDRAULIC ARRANGEMENT

(75) Inventors: Mario Seebode, Mannheim (DE); Thilo Kazimiers, Bahretal (DE)

(73) Assignee: DEERE & COMPANY, Moline, IL (US)

( * ) Notice: Subject to any disclaimer, the term of this patent is extended or adjusted under 35 U.S.C. 154(b) by 347 days.

(21) Appl. No.: 13/818,218

(22) PCT Filed: Oct. 26, 2011

(86) PCT No.: PCT/EP2011/068765

§ 371 (c)(1),
(2), (4) Date: May 8, 2013

(87) PCT Pub. No.: WO2012/055917

PCT Pub. Date: May 3, 2012

(65) Prior Publication Data

US 2013/0219874 A1 Aug. 29, 2013

(30) Foreign Application Priority Data

Oct. 29, 2010 (DE) ........................ 10 2010 043 135

(51) Int. Cl.
*F16D 31/02* (2006.01)
*F15B 11/16* (2006.01)
(Continued)

(52) U.S. Cl.
CPC ............. *F15B 11/161* (2013.01); *E02F 9/2235* (2013.01); *E02F 9/2296* (2013.01); *F02D 29/04* (2013.01); *F15B 11/165* (2013.01); *F15B 15/00* (2013.01); *F15B 21/042* (2013.01); *F15B 2211/20523* (2013.01);
(Continued)

(58) Field of Classification Search
CPC ........... F15B 11/161; F15B 2211/3053; F15B 11/165; E02F 9/2235
See application file for complete search history.

(56) References Cited

U.S. PATENT DOCUMENTS 6,082,106 A 7/2000 Hamamoto
7,020,553 B2 * 3/2006 Nakamura et al. .............. 701/50
(Continued)

FOREIGN PATENT DOCUMENTS

DE 102004056418 A1 5/2006
EP 0945619 B1 6/2007
(Continued)

OTHER PUBLICATIONS

Line pressure controller for automatic transmission, (Jan. 7, 2010, [database online], [retrieved on Jun. 2, 2015] Retrieved from the WIPO database using Internet <URL: https://patentscope.wipo.int/search/en/detail.jsf?docId=WO2010001665&recNum=2&maxRec=2&office=&prevFilter=&sortOption=Pub+Date+Desc&queryString=FP%3A%28WO2010001665%29&tab=PCT+Biblio>.*
(Continued)

*Primary Examiner* — Michael Leslie

(57) ABSTRACT

A hydraulic arrangement (10) to increase a motor load is described. The hydraulic arrangement comprises a hydraulic consumer (28), a load pressure-controlled hydraulic pump (24), a hydraulic tank (26), and a hydraulic control circuit (30), connected with the hydraulic consumer (28), with which a volume flow conveyed by the hydraulic pump (24) can be changed, wherein the hydraulic control circuit (30) comprises an excess pressure valve (42) and an electronically controllable control valve (36). In order to ensure a prioritization of the hydraulic consumer with a simultaneous increase of the motor bad, a proposal is made that the hydraulic control circuit (30) comprise a load pressure-controlled pressure compensator (38) between the excess pressure valve (42) and the control valve (36).

8 Claims, 2 Drawing Sheets

Figure 1:
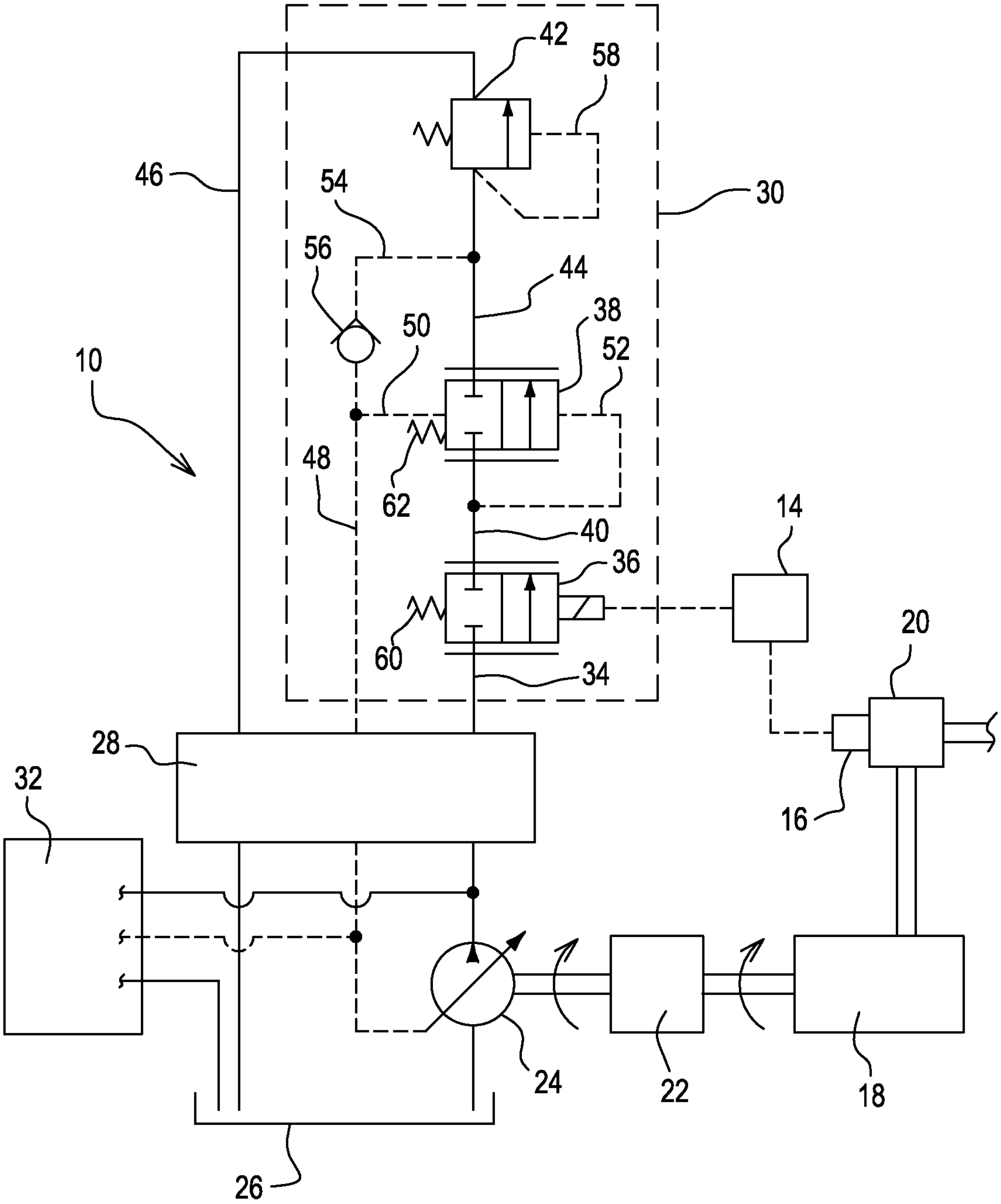

(51) Int. Cl.

| | |
|---|---|
| ***E02F 9/22*** | (2006.01) |
| ***F02D 29/04*** | (2006.01) |
| ***F15B 21/04*** | (2006.01) |
| ***F15B 15/00*** | (2006.01) |

(52) U.S. Cl.

CPC ................. *F15B 2211/20546* (2013.01); *F15B 2211/40569* (2013.01); *F15B 2211/426* (2013.01); *F15B 2211/50518* (2013.01); *F15B 2211/61* (2013.01); *F15B 2211/633* (2013.01); *F15B 2211/665* (2013.01)

(56) References Cited

U.S. PATENT DOCUMENTS

| | | | | |
|---|---|---|---|---|
| 2005/0071064 | A1 | 3/2005 | Nakamura et al. | |
| 2009/0031719 | A1* | 2/2009 | Tsuruga et al. | 60/420 |
| 2010/0058743 | A1* | 3/2010 | Tsukada et al. | 60/287 |

FOREIGN PATENT DOCUMENTS

| | | | | |
|---|---|---|---|---|
| EP | 1832685 | A1 | | 12/2007 |
| EP | 2151526 | A1 | | 10/2010 |
| EP | 2270284 | A1 | | 5/2011 |
| WO | 2008023516 | A1 | | 2/2008 |
| WO | WO2010001665 | | * | 1/2010 |
| WO | 2010050305 | A1 | | 5/2010 |

OTHER PUBLICATIONS

Exhaust gas cleaning system for diesel engine, (Mar. 11, 2010, [database online], [retrieved on Jun. 2, 2015] Retrieved from the Google Patent Database using Internet <URL: http://www.google.tl/patents/US20100058743>.*

* cited by examiner

HYDRAULIC ARRANGEMENT

The invention concerns a hydraulic arrangement with at least one hydraulic consumer, a load pressure-controlled hydraulic pump, a hydraulic tank, and a hydraulic control circuit, connected with the hydraulic consumer, with which a volume flow conveyed by the hydraulic pump can be changed, wherein the hydraulic control circuit comprises an excess pressure valve and an electronically controllable control valve. Furthermore, the invention concerns an agricultural vehicle having such a hydraulic arrangement Equipping agricultural vehicles, such as tractors, harvesters, or other self-propelled machinery, or also construction equipment, with a hydraulic control circuit is known; the hydraulic control circuit is designed in such a way and is connected on a hydraulic circuit or on a hydraulic system-or on a hydraulic consumer, so that in certain operating states, in particular, with low motor speeds and/or low motor loads, a volume flow conveyed by a load pressure—controlled hydraulic pump is increased. In particular, such hydraulic control circuits are used to artificially and temporarily increase the motor load, in order to reach an exhaust gas temperature required for the burning-out of a diesel particulate filter. A motor load increase is carried out such that a higher volume Row is conveyed by the hydraulic pump and, correspondingly, a higher motor load is called up on the motor. Such hydraulic control circuits for the increase of the motor load usually comprise an excess pressure valve, which can be switched on, in connection with a switching valve that is controlled by an electronic control unit, so that an additional volume flow is discharged and thus an increase in volume flow is obtained at the hydraulic pump, wherein the activation of the excess pressure valve or the control of the control valve is carried out if the electronic control unit delivers a corresponding signal that indicates an excessively low exhaust gas temperature at the diesel particulate filter. The aforementioned hydraulic control circuit is designed in such a way that an activation of the control circuit—that is, a witching-on of the excess pressure valve or a control of the switching valve—does not affect the hydraulic provisioning of hydraulic priority systems, such as a hydraulic braking system, hydraulically supported steering, etc. However, it is as a rule different with secondary hydraulic systems or secondary hydraulic consumers. With the switching-on of the excess pressure valve or the control of the switching valve, the hydraulic provisioning of a secondary consumer, connected to the hydraulic arrangement—whether an additional hydraulic motor, a hydraulic suspension device with hydraulic lift, a front loader or the like—is interrupted or temporarily suspended. A prioritization of the hydraulic secondary system or of the secondary hydraulic consumer does not take place, which can lead to sudden performance fluctuations or the temporary suspension of the secondary system.

The object of the invention is found in indicating a hydraulic arrangement of the type mentioned at the beginning, by means of which the aforementioned problems are overcome.

The object is achieved, in accordance with the invention, by the teachings of Patent claims 1 and 7. Other advantageous developments and refinements of the invention can be deduced from the subclaims.

In accordance with the invention, a hydraulic arrangement of the above-mentioned type is designed in such a way that the hydraulic control circuit-between the excess pressure valve and control valve comprises a load pressure-controlled pressure compensator. The load pressure-dependent pressure compensator, downstream from the control valve, effects a priority control for a hydraulic consumer (secondary consumer), so that it can continue to be operated independently of an increase in the motor load or a volume flow conveyance of the hydraulic pump, without performance fluctuations or lapses occurring.

The load pressure control of the pressure compensator and the hydraulic line can take place by means of a load pressure line, connected with the hydraulic consumer, which reports or signals the prevailing operating pressure at the consumer. The load pressure line can be connected with a first control pressure line, which leads to the pressure compensator and impinges on it unilaterally with the pressure prevailing in the load pressure line. By the pressure-impinging of the first control pressure line, the pressure compensator can be pushed in a corresponding first direction.

The proportional control valve and the pressure compensator can be connected with one another via a first hydraulic line, wherein a second control pressure line branches off from the first hydraulic line to the pressure compensator. The control pressure line brings about a pressure impingement on the pressure compensator on the side lying opposite the aforementioned first control pressure line. By means of the pressure impingement of the second control pressure line, it is possible to push the pressure compensator into a corresponding second direction, opposite to the first direction. Thus, the pressure compensator Is brought or forced into a specific position, on the one hand, by a pressure prevailing in the second control pressure line, wherein, on the one hand, the load pressure and, on the other hand, the supply pressure, adjacent to the consumer and generated by the hydraulic pump, close to the pressure compensator.

The pressure compensator and the excess pressure valve are connected via a second hydraulic line. Furthermore, a third control pressure line can be provided, which is connected with the load pressure line. In order to avoid a volume flow through the load pressure line in the direction of the second hydraulic line and thus a circumvention of the pressure compensator, a nonreturn valve, which closes in the direction of the second hydraulic line, can be placed in the third control pressure line. This guarantees that a pressure always builds up in the direction of the pressure compensator in the first control pressure line and that it cannot build up in the direction of the second hydraulic line.

In order to achieve continuously variable priority control, the pressure compensator can be designed as a proportional valve.

The electronically controllable control valve can also fee designed as a proportional control valve, wherein a demand-controlled volume flow increase can be achieved. In addition to the lack of priority control tor a hydraulic (secondary) consumer, the hydraulic control circuits known in the prior art are typically equipped with a simple switching valve. With an activation of a control circuit with a simple switching valve, there is a demand-independent, permanently-set volume flow discharge, wherein a motor load increase takes place that can exceed the extent necessary for the exhaust gas temperature increase and thus energy and fuel would be unnecessarily consumed or wasted. By means of a control valve designed as a proportional control valve, on the other hand, it is possible for a metered and thus demand-controlled volume flow increase to take place, wherein the aforementioned disadvantages can be overcome. Nevertheless, it is alternatively conceivable, with a retention of the priority control, to place a simple switching valve instead of the proportional control valve; it has merely an opening and a closing position (two end positions, no intermediate positions), wherein then, as mentioned above, a demand-controlled volume flow increase cannot take place.

A hydraulic arrangement, in accordance with the embodiments above, can be placed in an agricultural vehicle. In this regard, it is also conceivable to provide such an arrangement on construction machinery or on another work vehicle. The vehicle has a combustion engine, in particular, a diesel motor, and an electronic control unit. The electronic control unit is designed in such a way that a control of the control valve can be carried out by correspondingly generated control signals, wherein the control signals can be generated as a function of specific operating states on the vehicle. Furthermore, the hydraulic pump can be driven, directly or indirectly, by the combustion engine—that is, a direct connection to the motor crankshaft or an indirect connection can be provided. In addition, a transmission gearing can be interposed or the combustion engine can supply a generator, which, in turn, drives an electric motor so as to drive the pump.

The combustion engine can be connected to a diesel particulate filter, by means of which the exhaust gas flowing out of the combustion engine can be purified. The diesel particulate filter can comprise a device for the burnout of filtered diesel particles, so that a purification of the diesel particulate filler takes place. In this respect, a sensor connected with the electronic control unit can also be provided, via which the exhaust gas temperature can be recorded, preferably at the inlet of the diesel particulate filter, and, as a function thereof, the electronic control unit generates a control signal for the control of the control valve of the hydraulic arrangement.

The vehicle can also contain a hydraulically operated gear and a sensor that records the oil temperature of the gear and is connected to the electronic control unit, wherein the control valve can be controlled as a function of a signal of the sensor or as a function of the oil temperature. For example, in this way, an oil temperature regulation can be carried out in cold weather operation, and the efficiency of a gear can be optimized.

The vehicle can also contain a sensor that records a drag torque of the combustion engine or other means that record the drag torque of the combustion engine, wherein the control valve can be controlled, as a function of a signal of the sensor or of the means or as a function of the drag torque of the combustion engine. Via corresponding signals of the sensor or of the means recording the drag torque, which reflect, for example, operating variables, such as the motor rpm, speed, torque, etc., the drag torque on the combustion engine can be recorded and changed or optimized or controlled via the control implemented in the hydraulic arrangement. The drag torque can thus enter as a control variable into the control of the hydraulic arrangement, so as to, for example, bring about an optimal motor braking in specific operating states. This means that during a propulsion operation of the combustion engine—that is, in an operating state in which a braking moment is exerted by the combustion engine on a drive train of the vehicle—the hydraulic arrangement, in accordance with the invention, can be used or called upon for the optimization of this propulsion operation.

With the aid of the drawings, which show an embodiment example of the invention, the invention and other advantages and advantageous refinements and developments of the invention are described and explained in more detail.

Figure 2:
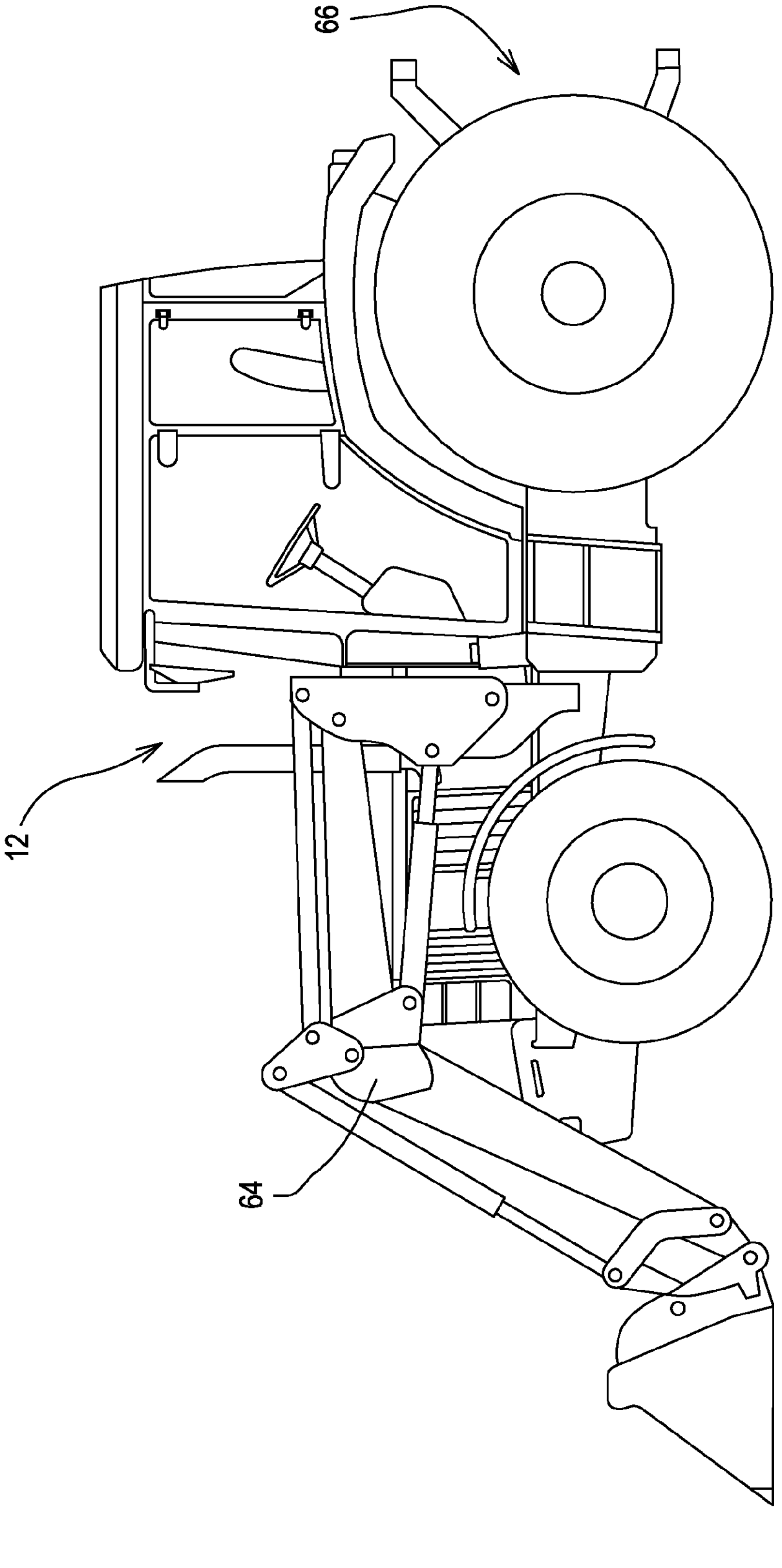

The figures show the following:

FIG. 1, a schematic circuit diagram of a hydraulic arrangement, in accordance with the invention; and FIG. 2, a schematic side view of a vehicle having a hydraulic arrangement in accordance with FIG. 1, FIG. 1 shows a system for the priority-controlled and demand-oriented performance enhancement of a combustion engine of an agricultural vehicle. The system comprises a hydraulic arrangement 10 for an agricultural vehicle 12 in the form of a tractor (see FIG. 2), and thus connected component, placed on the vehicle 12, in particular, an electronic control unit 14, a temperature sensor 16, a combustion engine 18, a diesel particulate filter 20, and a drive transmission unit 22, connected with the combustion engine 18, in particular, a hydraulically operated gearing.

The hydraulic arrangement 10 comprises a load pressure-controlled (load-sensing) hydraulic pump 24, which is driven by the drive transmission unit 22 and, via this unit, is drive-connected with the combustion engine 18. The hydraulic pump is designed as a load pressure-controlled (variable) displacement pump, which, as the result of a changing load pressure signal, its conveying volume can change with a constant or changeable conveying speed.

The hydraulic arrangement 10 also comprises a hydraulic tank 26, a hydraulic consumer 28, and a hydraulic control circuit 30 connected therewith. Other hydraulic consumers 32 can be included on the vehicle 12, which are not shown here in further detail and can be primarily dispensed by the hydraulic pump 24—that is, independently of the hydraulic consumer 28 and independently of a volume flow change by the hydraulic control circuit 30—or can be connected with the hydraulic tank 26. Other hydraulic consumers 32 can, for example, be a hydraulic brake system, a hydraulic suspension, hydraulic steering, or some other hydraulic provisioning of actuators.

The hydraulic switching circuit 30 is connected with a hydraulic supply line 34 and comprises an electronically controllable proportional control valve 36, connected therewith, a pressure compensator 38, designed as a proportional valve, a first hydraulic line 40, connecting the proportional control valve 36 and the pressure compensator, an excess pressure valve 42, and a second hydraulic line 44, connecting the pressure compensator 38 with the excess pressure valve 42. The hydraulic switching circuit 30 is connected with a discharge line 46, which leads from the excess pressure valve 42 into the hydraulic tank 26. Moreover, the hydraulic switching circuit 30 is connected, with a load pressure line 48 (load-sensing line), which delivers a load pressure of the hydraulic consumer 28 to the control of the pressure compensator 38 and the hydraulic pump 24. In this regard, a first control pressure line 50 is provided, which connects the pressure compensator, on a pressure side, with the load pressure line 48. On the pressure side lying opposite, the pressure compensator 38 is connected with the first hydraulic line 40 via a second control pressure line 52. A third control pressure line 54 connects the load pressure line 48 with the second hydraulic line 44, wherein a nonreturn valve 56, which closes in the direction of the second hydraulic line 44, is located in the third control pressure line 54. The excess pressure valve 42 is closed in the normal case and is controlled via another control pressure line 58, which is connected with the second hydraulic line 44. The control valve 36 is closed in the normal case by an adjusting spring 60 and is controlled by a control signal, which is generated by the electronic control unit 14. The pressure compensator 38 is pre-tensioned by an adjusting spring 62 into a middle position and is pushed, by the pressure prevailing in the first or the second control pressure line 50, 52, into a position corresponding to the pressure difference.

The hydraulic consumer is represented here as a secondary consumer—that is, primary hydraulic consumers, such as a hydraulic brake system or hydraulically supported steering on the vehicle 12, are not represented. The hydraulic consumer can be, for example, a hosting unit for a front loader 64, a hydraulic lift on a three-point suspension device 66, or also a hydraulic motor, placed on the vehicle 12 (not shown). Also, other hydraulically operated components or devices, which can be placed in or on the vehicle 12, should be understood by the term secondary consumer (for example, from hitch, mowing attachment, etc.).

Under normal operating conditions, motor performances are called upon the combustion engine 18 of the vehicle 12, in which an exhaust gas temperature sufficient for the burnout procedures of the diesel particulate filter 20 prevails. However, if, because of an excessively low motor load operation (vehicle operation with a low speed and/or low performance output), this temperature cannot be achieved in the exhaust gas, in particular, in the area of the diesel particulate filter, then the burnout procedures cannot take place or cannot be carried out completely. In this case, in accordance with the invention, an artificial motor load increase can take place, wherein the same vehicle operating state can be retained. In this case, the temperature sensor 16 of the electronic control unit 14, located on the diesel particulate filter 20, signals an exhaust gas temperature that is under an adjustable threshold value (burnout temperature) (preferably on the inlet of the diesel particulate filter 20), whereupon the electronic control unit 14 generates a control signal for the control of the control valve 36. By the control of the control valve 36, an additional hydraulic volume flow (loss flow) is called up and via the opened (controlled) control valve 36, the pressure compensator 38, and the opening excess pressure valve 58, is conducted into the hydraulic tank 26. At the same time, via the load pressure line 48, an increased load pressure is signaled, whereupon, on the one hand, the pressure compensator 38 (via the adjacent control pressure lines 50, 52) is adjusted and, on the other hand, the conveying volume at the hydraulic pump 24 (via the nearby load pressure line 48) is increased. The increase of the conveying volume on the adjustable hydraulic pump 24 leads, with a constant conveying rpm or with a constant motor rpm, to an increased performance output of the combustion engine 18. The motor load is increased. This, in turn, produces a temperature increase in the exhaust gas to higher than the pre-specified threshold value (burnout temperature), so that a burnout of the diesel particulate filter can take place. As soon as the burnout procedures have been concluded, a corresponding report is conveyed (by sensor means not shown here) to the sensor unit 14, whereupon a corresponding control signal for the closing of the switching valve 36 is generated. By the pressure compensator 38, located downstream from the switching valve 36, it is ensured that a volume flow increase takes place to such a degree that, on the one hand, the hydraulic consumer 28 can continue its operation unchanged (prioritization of the secondary consumer), and, on the other hand, the required increase of the performance output of the combustion engine 18 (motor load increase) for the adaptation of the exhaust gas temperature to the temperatures required for the burnout procedures of the diesel particulate filter 20 is obtained. By means of the control valve 36, designed as a proportional valve, a control of the valve takes place by the electronic control unit 14, in a demand-controlled manner—that is, only to the extent that the vehicle operating state requires it.

Even if the invention was described merely with the aid of one embodiment example, many different alternatives, modifications, and variants, which fall under the invention under consideration, become apparent to the specialist in light of the preceding description. Thus, for example, such a hydraulic arrangement 10 can be designed in such a way that, via a sensor 14', an oil temperature of a hydraulic consumer, for example, a hydraulically operated gearing 22, is monitored and is controlled analogously to the control of the exhaust gas temperature, or enters, as a control variable, into the control of the hydraulic arrangement 10, so as to counter fluctuations of the operating temperature of the hydraulic consumer or in order to maintain it at an optimal operating value. Other embodiment examples of a hydraulic arrangement 10 in accordance with the invention can be such that, via a suitable sensor 14" or other means, operating variables (rpm, speed, torque, etc.) are recorded and a drag torque is determined, therefrom, at the combustion engine 18. This can then be controlled analogously to the control of the exhaust gas temperature or can enter, as a control variable, into the control of the hydraulic arrangement 10, so as to, for example, produce an optimal motor braking in specific operating states, for example, in a propulsion operation of the combustion engine 18, or in these operating states, to optimize the motor braking or the propulsion operation.

The invention claimed is:

1. A hydraulic arrangement comprising:

a hydraulic consumer;

a load pressure-controlled hydraulic pump driven by a vehicle combustion engine;

a hydraulic tank;

an electronic control unit;

a hydraulic control circuit connected with the hydraulic consumer and controlling a volume flow conveyed by the hydraulic pump, the hydraulic control circuit including:

an excess pressure valve connected to the hydraulic tank, an electronically controlled control valve connected to the electronic control unit, the control valve connected to a hydraulic supply line connected to the hydraulic pump, a load pressure-controlled pressure compensator connected between the excess pressure valve and control valve, a first control pressure line that branches off from a load pressure line to the pressure compensator, the load pressure line connected to the hydraulic pump and to the hydraulic consumer, a first hydraulic line that connects the control valve and the pressure compensator, a second control pressure line that branches off from the first hydraulic line to the pressure compensator, a second hydraulic line, connecting the pressure compensator and the excess pressure valve, a third control pressure line connecting the second hydraulic line with the load pressure line, and a nonreturn valve, which closes in the direction of the second hydraulic line, is located in the third control pressure line.

2. The hydraulic arrangement of claim 1, wherein:

the pressure compensator is a proportional valve.

3. The hydraulic arrangement of claim 1, wherein:

the control valve is a proportional control valve.

4. The hydraulic arrangement of claim 1, wherein:

the control valve is controlled by a vehicle electronic control unit.

5. The hydraulic arrangement of claim 4, further comprising:

a diesel particulate filter; and a sensor which generates a signal representing an exhaust gas temperature or diesel particulate filter temperature, the sensor being connected to the electronic control unit, and the control valve is controlled as a function of the sensor signal to raise the exhaust gas temperature.

6. The hydraulic arrangement of claim 4, further comprising:

a hydraulically operated gearing; and a sensor which generates a signal representing an oil temperature of the gearing, the sensor being connected with the electronic control unit, and the control valve is controlled as a function of the sensor signal.

7. The hydraulic arrangement of claim 4, further comprising:

a sensor which generates a signal representing a drag torque of the combustion engine, and the control valve is controlled as a function of the sensor signal.

8. The hydraulic arrangement of claim 1, wherein the electronic control unit is configured to control the control valve to selectively increase loading of the hydraulic pump by causing a flow through the excess pressure valve thereby increasing loading of the vehicle combustion engine.

* * * * *